United States Patent
Yamashita et al.

(10) Patent No.: US 7,553,424 B2
(45) Date of Patent: Jun. 30, 2009

(54) METHOD FOR CONTROLLING STERILE WATER PRODUCTION DEVICE

(75) Inventors: Koji Yamashita, Okayama (JP); Masayuki Shigemoto, Okayama (JP); Motoi Masuda, Okayama (JP); Haruaki Nasu, Okayama (JP)

(73) Assignee: HSP Co., Ltd., Okayama (JP)

( * ) Notice: Subject to any disclaimer, the term of this patent is extended or adjusted under 35 U.S.C. 154(b) by 175 days.

(21) Appl. No.: 11/666,436

(22) PCT Filed: Apr. 27, 2006

(86) PCT No.: PCT/JP2006/308860
§ 371 (c)(1),
(2), (4) Date: Apr. 27, 2007

(87) PCT Pub. No.: WO2006/129438
PCT Pub. Date: Dec. 7, 2006

(65) Prior Publication Data
US 2007/0267354 A1 Nov. 22, 2007

(30) Foreign Application Priority Data
May 31, 2005 (JP) .............................. 2005-158377

(51) Int. Cl.
*C02F 1/76* (2006.01)

(52) U.S. Cl. .................... 210/743; 210/752; 210/756
(58) Field of Classification Search ................. 210/756, 210/743, 752, 142; 422/3
See application file for complete search history.

(56) References Cited
U.S. PATENT DOCUMENTS
2005/0218054 A1 * 10/2005 Sakata et al. ................. 210/192

* cited by examiner

*Primary Examiner*—Matthew O Savage
*Assistant Examiner*—Paul J Durand
(74) *Attorney, Agent, or Firm*—Oliff & Berridge, PLC

(57) ABSTRACT

In controlling a sterile water production device, if pH of sterile water is smaller than a preset pH, an additional aqueous hypochlorite solution is injected into the sterile water to increase the pH back to the preset pH, and a molar quantity of residual alkaline impurities present in such additional aqueous hypochlorite solution is determined. Next, a predetermined amount of further additional aqueous hypochlorite solution is injected into the sterile water, wherein such predetermined amount is an amount required to yield additional content of hypochlorous acid in a resulting sterile water, to such a degree that a molar quantity of that hypochlorous acid is equal to the foregoing determined molar quantity of residual alkaline impurities. After such injection, pH of sterile water yielded is increased, and an acid aqueous solution is then injected into the sterile water to thereby decrease the increased pH back to the preset pH.

6 Claims, 6 Drawing Sheets

METHOD FOR CONTROLLING STERILE WATER PRODUCTION DEVICE

TECHNICAL FIELD

The present invention relates to a method for controlling operation of a sterile water production device for continuously producing a weak acid water (i.e. sterile water) which contains hypochlorous acid, with its acidity adjusted to a weak acidic condition.

BACKGROUND ART

An aqueous solution of hypochlorous acid, i.e. a water containing hypochlorous acid whose pH is adjusted to provide a weak acidity (a water containing HOCl), is reasonably inexpensive and has a great sterilizing power, while being of a high safety to a human body. Therefore, such aqueous hypochlorous acid solution finds enormous uses in various fields, including a typical exemplary use as a sterile water for cleaning purposes in medical facilities, food industries, and so forth. Various sorts of sterile water production devices capable of continuously producing a great amount of the sterile water of this kind have been manufactured and made available on markets.

Among the foregoing sterile water production devices, there is, for instance, a mixing type of devices operable for adding hydrochloric acid solution and aqueous hypochlorite solution (e.g. aqueous solution of sodium hypochlorite) to a raw water (e.g. tap water or well water) and intermixing those three liquids together, so as to continuously produce a great amount of sterile water containing hypochlorous acid therein. An example of this particular mixing-type sterile water production device is taught in the Japanese Laid-Open Patent Publication No. 2003-401047.

In this context, as understandable from chemical equation in the "Chem 1" below, a hypochlorite present in the aqueous hypochlorite solution becomes decomposed and inactive with the passage of time, and further, deactivation of that hypochlorite becomes rapid in the case that the aqueous hypochlorite solution is stored at a high ambient temperature. Consequently, if the aqueous hypochlorite solution that has been unused for a long period of time or stored at a high ambient temperature is intermixed and reacted with hydrochloric acid solution and raw water as stated above to produce a sterile water, a concentration of hypochlorous acid in the resulting sterile water is actually smaller and less sufficient than expected, because the concentration of hypochlorous acid in the sterile water is reduced to a level equal to an amount of the decomposed and/or deactivated portion of hypochlorite content in this deteriorated kind of aqueous hypochlorite solution.

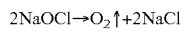

$$2NaOCl \rightarrow O_2\uparrow + 2NaCl \quad [Chem\ 1]$$

The concentration of residual chlorine (or hyphochlorous acid) in sterile water is an important factor for retaining a sterilizing power of the sterile water, because the sterilizing power is dependent upon a concentration of the residual chlorine as well as upon a pH of the residual chlorine. It is therefore necessary that, according to a degree of deactivation of hypochlorite, an appropriate additional amount of aqueous hypochlorite solution should be injected to insure that a residual chlorine concentration in sterile water being produced is maintained to a preset degree.

For that purpose, the above-described type of sterile water production device requires incorporating a residual chlorine densitometer to continuously determine a residual chlorine concentration in a sterile water being produced by that device, and also requires a control system for controlling and adjusting the residual chlorine concentration, such that, upon detecting a decreased concentration of residual chlorine in the sterile water, a correspondingly increased amount of aqueous hypochlorite solution is injected into the sterile water production device, to thereby increase the residual chlorine concentration to the preset degree.

However, the residual chlorine densitometer is an extraordinarily expensive meter, and therefore, incorporation of such densitometer in the foregoing type of sterile water production device results in providing an undesirably high-priced sterile water production device. In view of such cost problem, some inepensive sterile water production devices have been manufactured and made available on market, which each employs a pH meter for measuring pH of sterile water being produced, instead of the residual chlorine desitometer, and operates to detect and adjust changes of pH in the sterile water to a normal pH level, thereby indirectly controlling a residual chlorine concentration in the sterile water.

The foregoing control of residual chlorine concentration via pH meter is based on the following chemical adjustment procedures: When aqueous hypochlorite solution containing an insufficient amount of hypochlorite due to the foregoing deactivation reasons is injected in the presence of hydrochloric acid, a certain amount of the hydrochloric acid naturally remains intact as a surplus hydrochloric acid in a sterile water produced, since the amount of hypochlorite is insufficient for full reaction with that hydrochloric acid, thus resulting in the sterile water produced being in a low pH level, and, in order to adjust and restore such low pH level to a preset pH, additional injection of appropriate amount of aqueous hypochlorite solution effectively causes the surplus hydrochloric acid to be neutralized therewith and absent, whereby the pH is increased and restored to a preset pH and therefore a desired concentration of residual chlorine is contained in a resulting sterile water.

Theoretically, the above-described pH control method is feasible on the understanding that the aqueous hypochlorite solution contains very few residual alkaline impurities therein. But, in the case that the residual alkaline impurities are contained at an appreciable rate (0.3 to 2.4%) in the aqueous hypochlorite solution, it must be noted that a substantive rate of injected hydrochloric acid reacts with such appreciable rate of residual alkaline impurities, and thus, the rate of the hydrochloric acid in a sterile water produced decreases accordingly, which means that the residual alkaline impurities serve to adjust and restore a decreased pH to a preset normal pH level. Hence, in spite of a pH meter indicating such preset pH for the sterile water produced, an actual amount of the hypochlorous acid present in that sterile water, which is yielded by reaction between the aqueous hypochlorite solution and the hydrochloric acid solution, is still insufficient to attain a desired concentration of residual chlorine in the sterile water. Without noticing such fact, to merely continue injection of the aqueous hypochlorite solution and monitoring pH of produced sterile water in the foregoing manner will eventually result in a progressive reduction of residual chlorine concentration in the serial water, as a consequence of which, a sterilizing power of finally produced sterile water decreases considerably.

Cited Patent Literature 1: the Japanese Laid-Open Patent Publication No. 2003-401047

DISCLOSURE OF THE INVENTION

Problems to be Solved by the Invention

A technical solution contemplated by the present invention is directed to the foregoing problem that the aqueous hypochlorite solution may merely continue to be injected in an attempt to adjust and restore a decreased pH to a preset pH level, without noticing the deactivation of hypochlorite and the residual alkaline impurities in the aqueous hypochlorite solution, which eventually results in the concentration of residual chlorine in a serial water produced becoming lower and lower, thus decreasing the sterilizing power of the sterile water.

Means for Solving the Problems

In accordance with the present invention, there is provided a method for controlling a sterile water production device operable to cause at least injection of an aqueous hypochlorite solution into a raw water to thereby produce a sterile water of weak acidity which contains a hypochlorous acid as an active ingredient, the method being characterized by the steps of: detecting decrease of pH of the sterile water to a level smaller than a preset pH, and responsive thereto, increasing injection rate of the aqueous hypochlorite solution so as to inject an additional aqueous hypochlorite solution into the sterile water, so that the thus-decreased pH of the sterile water is increased back to the preset pH; then, determining a molar quantity of residual alkaline impurities present in the thus-injected additional aqueous hypochlorite solution; obtaining an additional amount of the aqueous hypochlorite solution for injection of a predetermined amount of further additional aqueous hypochlorite solution, wherein such predetermined amount of further additional aqueous hypochlorite solution is an amount required to yield additional content of hypochlorous acid in a resulting sterile water to be produced, to such a degree that a molar quantity of that particular hypochlorous acid is equal to the thus-determined molar quantity of residual alkaline impurities; then, increasing injection rate of the aqueous hypochlorite solution so as to inject the afore-said predetermined amount of further additional aqueous hypochlorite solution into the sterile water produced thus far, thereby yielding sterile water of increased pH in which the molar quantity of the hypochlorous acid is equal to the afore-said determined molar quantity of residual alkaline impurities; and injecting an acid aqueous solution so as to decrease said increased pH back to said preset pH.

In this context, the foregoing sterile water production device may be a device operable to cause injection of an acid aqueous solution and the aqueous hypochlorite solution into the raw water to thereby produce the sterile water of weak acidity which contains the hypochlorous acid as an active ingredient. The acid aqueous solution may be hydrochloric acid for instance, but any other kind of solution be used, insofar as it is an acid liquid.

Further, in accordance with the present invention, the afore-said molar quantity of residual alkaline impurities present in the injected additional aqueous hypochlorite solution may be determined by the following method: Namely, a method which uses the sterile water production device operable to cause injection of an aqueous hypochlorite solution into a raw water to thereby produce a sterile water of weak acidity which contains a hypochlorous acid as an active ingredient, and comprises the steps of: providing a plurality of aqueous hypochlorite solutions in a predetermined equal amount, the plurality of aqueous hypochlorite solutions being different from one another in terms of known molar quantity of residual alkaline impurities contained therein; then, injecting a selected one of such plurality of aqueous hypochlorite solutions alone into the sterile water production device; thereafter, effecting stepwise acid injection comprising the step of injecting an acid stepwise into the sterile water production device, so that the acid is stepwise increased and intermixed with the predetermined amount of the afore-said selected one of said plurality of aqueous hypochlorite solutions, while determining pH of sterile water being produced in each step of such stepwise acid injection; obtaining, from the stepwise acid injection, a relation between stepwise injected amounts of the acid and corresponding pH changes of sterile water being stepwise produced, with regard to the afore-said selected one of said plurality of aqueous hypochlorite solutions; providing a predetermined amount of aqueous hypochlorite solution containing an unknown molar quantity of residual alkaline impurities therein, and injecting the afore-said predetermined amount of aqueous hypochlorite solution alone into the sterile water production device; thereafter, effecting stepwise acid injection comprising the step of injecting an acid stepwise into the sterile water production device, so that the acid is stepwise increased and intermixed with the afore-said predetermined amount of aqueous hypochlorite solution, while determining pH of sterile water being produced in each step of the stepwise acid injection; obtaining, from the stepwise acid injection, a relation between stepwise injected amounts of the acid and corresponding pH changes of sterile water being stepwise produced, with regard to the afore-said predetermined amount of aqueous hypochlorite solutions; executing a comparison operation by making comparison between the relation between stepwise injected amounts of the acid and corresponding pH changes of sterile water being stepwise produced with regard to the afore-said selected one of said plurality of aqueous hypochlorite solutions, and the relation between stepwise injected amounts of the acid and corresponding pH changes of sterile water being stepwise produced with regard to the afore-said predetermined amount of aqueous hypochlorite solution; and determining, from results of such comparison operation, the unknown molar quantity of the residual alkaline impurities in the predetermined amount of aqueous hypochlorite solution, to thereby obtain a definite molar quantity of the residual alkaline impurities in that particular predetermined amount of aqueous hypochlorite solution.

Effects of the Present Invention

Accordingly, the method for controlling sterile water production device in the present invention provides the effects and advantages that a residual chlorine concentration in a sterile water produced can be properly controlled and adjusted by use of pH meter only, without any need for employing expensive residual chlorine densitometer, and that it is possible to insure preventing decreased sterilizing power of a sterile water to be produced.

Moreover, the method for controlling sterile water production device in the present invention makes it possible to properly control a residual chlorine concentration in a sterile water produced, without requiring expensive residual chlorine densitometer, which therefore realizes reduction of costs involved in the sterile water production device.

DESCRIPTION OF REFERENCE NUMERALS

Figure 1:
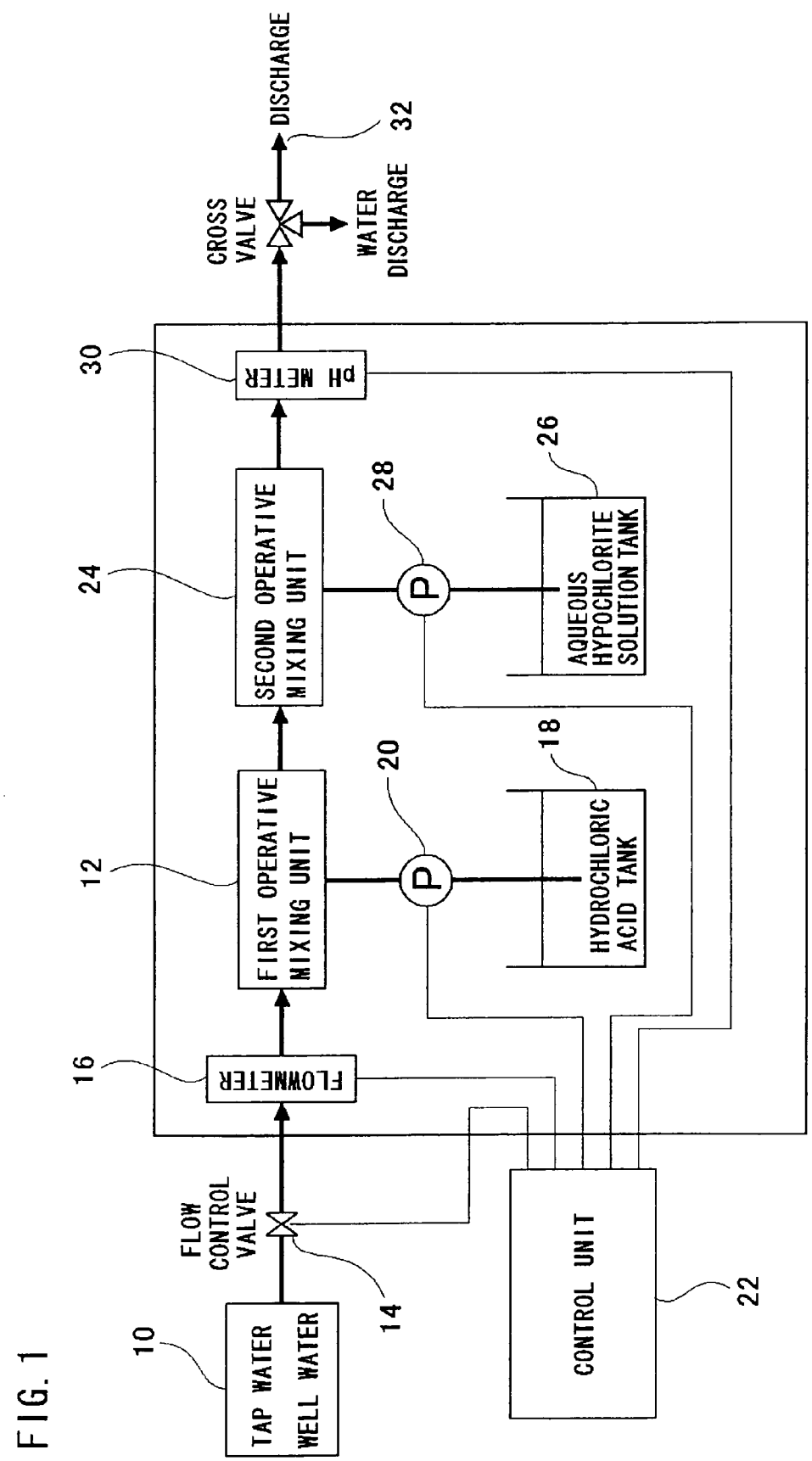
FIG. 1 A diagram for illustrating construction of a sterile water production device for producing a sterile water containing hypochlorous acid as an active ingredient.

10 Water source
12 First operative mixing unit
14 Flow control valve
16 Flowmeter
18 Hydrochloric acid tank
20 Hydrochloric acid pump
22 Control unit
24 Second operative mixing unit
26 Aqueous hypochlorite solution tank
28 Aqueous hypochlorite solution pump
30 pH meter
32 Discharge port

BEST MODE FOR CARRYING OUT THE INVENTION

The present invention achieves a purpose for controlling and adjusting a residual chlorine concentration in a sterile water, by means of pH meter only, without using any residual chlorine densitometer, with respect to a sterile water production device operable to cause injection of hydrochloric acid and aqueous hypochlorite solution into a water source so as to produce a sterile water of weak acidity which contains hypochlorous acid as an active ingredient.

Embodiment 1

Figure 2:
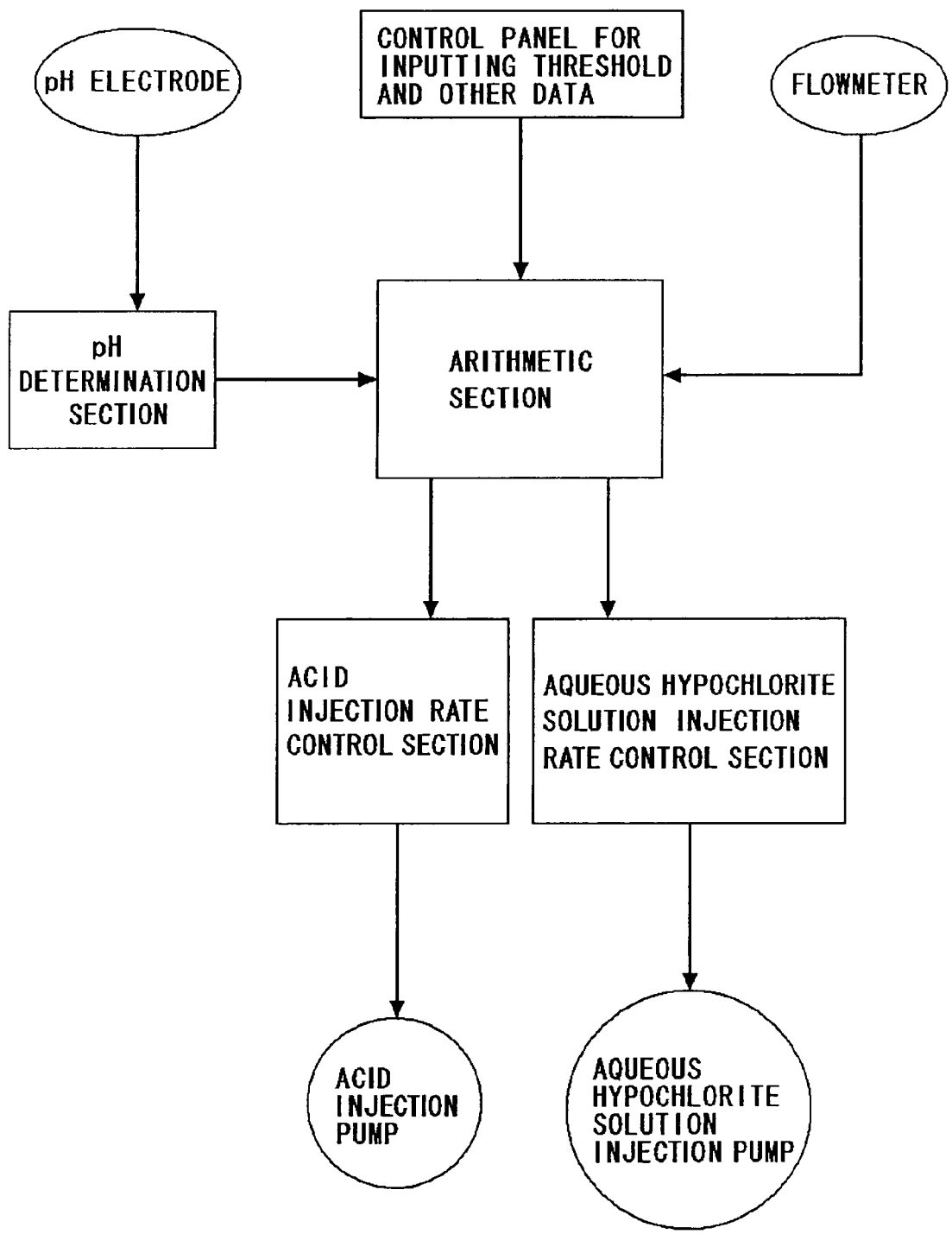
FIG. 2 A diagram for illustrating arrangement of a control system for controlling the sterile water production device.

FIG. 1 is a diagram illustrative of a sterile water production device for producing a sterile water containing hypochlorous acid as an active ingredient therein. FIG. 2 is a block diagram showing a control system provided in such sterile water production device. In those FIGS., designation 10 denotes a water source, and it is seen that a raw water may be supplied from that water source to a first operative mixing unit 12 by way of a flow control valve 14 as well as of a flowmeter 16.

An amount of the raw water to be supplied to the first operative mixing unit is measured by the flowmeter 16 and adjusted by valve opening and closing actions of the flow control valve 14. The flowmeter 16 has a connection with a control unit 22, such that a flow rate (in the form of data) of the raw water, which has been measured and obtained by the flowmeter 16, may be transmitted to the control unit 22. The flow control valve 14 also has a connection with the control unit 22 so as to be controlled by that particular control unit 22 for appropriate flow control actions.

Designation 18 denotes a hydrochloric acid tank in which a hydrochloric acid is contained. The hydrochloric acid may be supplied from such hydrochloric acid tank 18 by means of a hydrochloric acid pump 20 of rotary type and injected thereby into the first operative mixing unit 12. In this regard, a supplying rate of as well as injection rate of the hydrochloric acid to that mixing unit are changeable, depending on number of revolutions of the hydrochloric acid pump 20. Hence, by controlling the revolution of the hydrochloric acid pump 20, both supplying and injection rates of hydrochloric acid to the first operative mixing unit may be adjusted properly as required. The hydrochloric acid pump 20 has a connection with the control unit 22 so as to be controlled by that control unit 22 for a proper revolution thereof.

A stirrer/mixer means is provided in the first operative mixing unit 12. The raw water and hydrochloric acid, which have been injected into the first operative mixing unit 12, is stirred and intermixed with each other by such stirrer/mixer means within that particular first operative mixing unit 12, so that a dilute hydrochloric acid solution is yielded therein. Thereafter, the dilute hydrochloric acid solution is forced out of the first operative mixing unit 12 and further supplied to a second operative mixing unit 24.

Designation 24 denotes an aqueous hypochlorite solution tank in which aqueous hypochlorite solution is contained. The aqueous hypochlorite solution may be supplied from such aqueous hypochlorite tank 24 by means of an aqueous hypochlorite solution pump 28 of rotary type (which shall be referred to as "hypo pump" hereinafter) to the second operative mixing unit 24. Let us assume that the aqueous hypochlorite solution is now supplied and injected by the hypo pump 28 into the second operative mixing unit 24.

In this context, a supplying rate of as well as injection rate of the aqueous hypochlorite solution to the second operative mixing unit are changeable, depending on number of revolutions of the hypo pump 28. Hence, by controlling the revolution of the hypo pump 24, both supplying and injection rates of aqueous hypochlorite solution into the second operative mixing unit may be adjusted properly as required. The hypo pump 28 has a connection with the control unit 22 so as to be controlled by that control unit 22 for a proper revolution thereof.

The dilute hydrochloric acid solution is then injected into the second operative mixing unit 24 and intermixed with the aqueous hypochlorite solution therein, whereupon a sterile water having a weak acidity is produced. It is noted here that a chemical reaction occurs between hydrochloric acid and hypochlorite, thereby yielding a hypochlorous acid (HOCl) which is present in the sterile water.

The sterile water thus produced in the second operative mixing unit 24 is supplied via a pH meter 30 to a discharge port 32. The pH meter 30 has a connection with the control unit 22, such that a pH (in the form of data) of the sterile water, which is determined and obtained by that particular pH meter 30, may be transmitted to the control unit 22.

Figure 3:
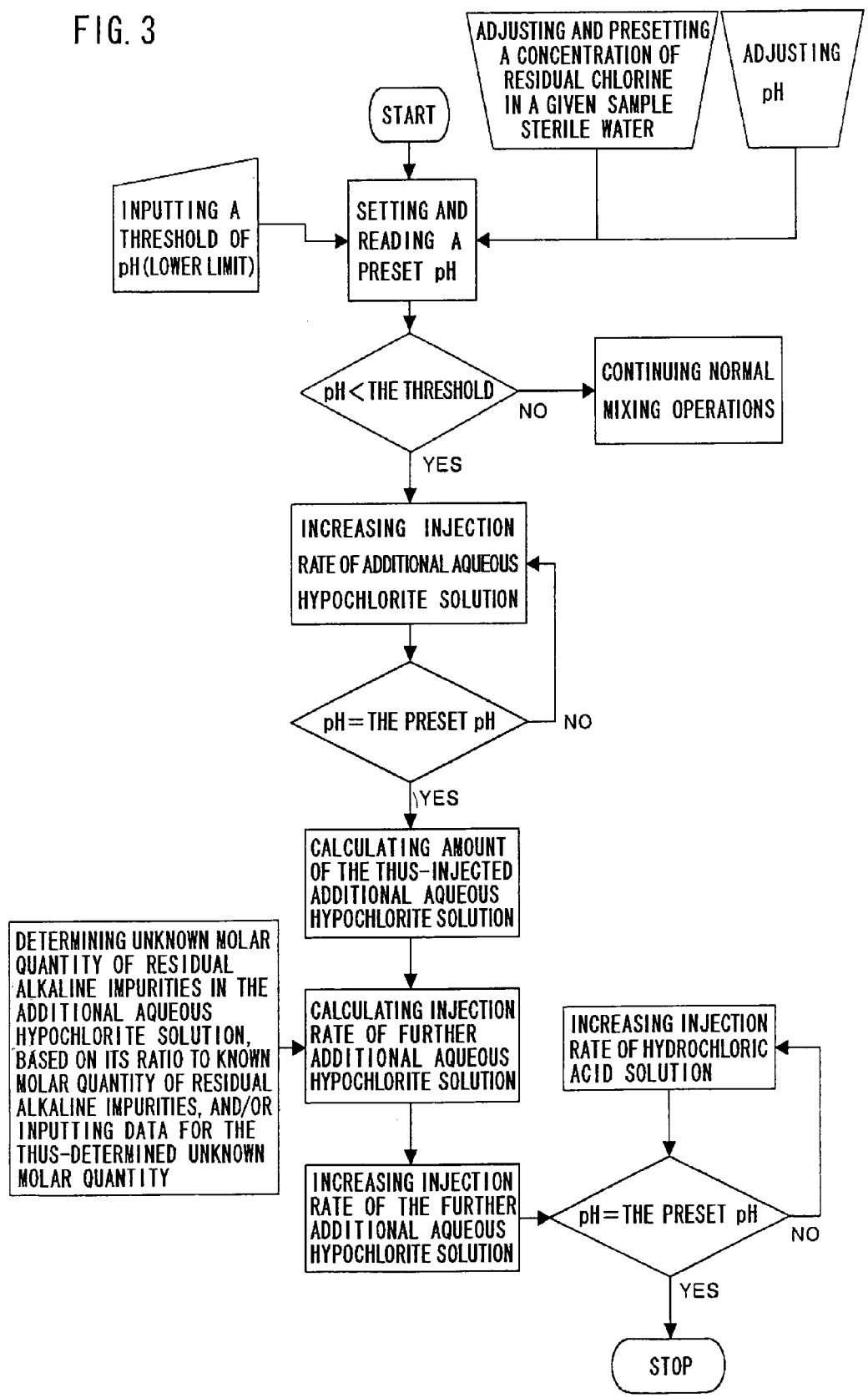
FIG. 3 A flow chart showing the steps of controlling and adjusting a residual chlorine concentration in a sterile water to be produced.

Now, a description will be made of how concentration of residual chlorine is controlled and adjusted in a sterile water to be produced, with reference to the flow of steps illustrated in the flow chart of FIG. 3.

If a pH of sterile water produced in the sterile water production device is higher than a preset threshold (lower limit), the above-described normal mixing operations of the sterile production device will be continued.

By contrast, if a pH of sterile water produced in the sterile water production device is smaller than the threshold, the number of revolutions of the hypo pump 28 is raised to increase the injection rate of the aqueous hypochlorite solution, thereby injecting additional aqueous hypochlorite solution into the second operative mixing unit, while simultaneously monitoring pH changes of sterile water being produced. Then, upon the pH of sterile water having been increased back to a preset pH, the hypo pump is stopped to cease the injection of such additional aqueous hypochlorite solution, at which time, the thus-increased injection rate of additional aqueous hypochlorite solution is calculated and obtained.

Next, with regard to the thus-injected additional aqueous hypochlorite solution, let us consider an amount of residual alkaline impurities present therein, and therefore, in summary, there is provided a process for: determining a molar quantity of residual alkaline impurities present in the additional aqueous hypochlorite solution that has been injected as above to an amount corresponding to the above-calculated increased injection rate; and obtaining an amount of further additional aqueous hypochlorite solution to be injected to the sterile water produced thus far, wherein such amount of further additional aqueous hypochlorite solution is an amount required to yield additional hypochlorous acid content in a final sterile water to be produced, to such a degree that a molar quantity of that particular hypochlorous acid content is equal to the thus-determined molar quantity of residual alkaline impurities.

Figure 4:
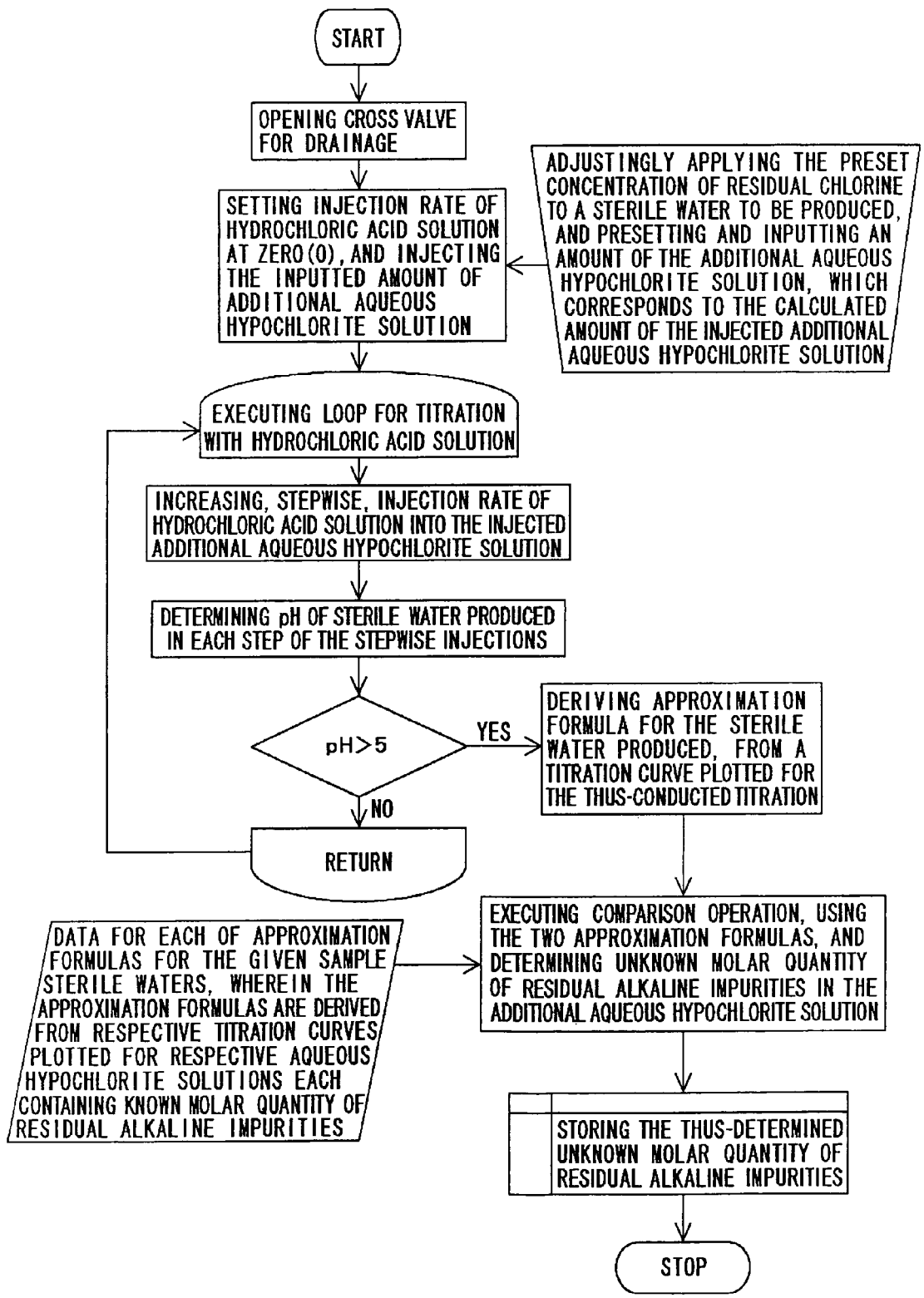
FIG. 4 A flow chart showing the steps of determining unknown molar quantity of residual alkaline impurities.

In this context, specific steps for the above-summarized determination of molar quantify of residual alkaline impurities are taken in accordance with the flow chart shown in FIG. 4. Namely, first of all, a plurality of given sample aqueous hypochlorite solutions are provided, which are different from one another in terms of known molar quantity of residual alkaline impurities contained therein. Those different sample aqueous hypochlorite solutions are all provided in an equal amount that has been set, and then, a selected one of such sample aqueous hypochlorite solutions is injected alone into the operative mixing unit of sterile water production device. Thereafter, a predetermined amount of hydrochloric acid solution is injected into that operative mixing unit in the presence of so selected sample aqueous hypochlorite solution, and continued to be injected stepwise thereinto, so that the hydrochloric acid solution is stepwise increased and intermixed with that particular sample aqueous hypochlorite solution. In such stepwise injection process, each time the hydrochloric acid solution is injected and mixed into the sample aqueous hypochlorite solution, a sterile water produced thereby is subjected to determination of its pH. After repetition of such titrimetric operation with hydrochloric acid, a relation between increasing rates of stepwise injection of hydrochloric acid solution and pH changes of sterile water being stepwise produced is defined arithmetically and formulated with regard to the afore-said selected sample aqueous hypochlorite solution. Those titration and arithmetical operations are conducted likewise for each of all other remaining sample aqueous hypochlorite solutions stated above, and all the results obtained thereby are stored as a data associated with the given sample aqueous hypochlorite solutions containing known molar quantity of residual alkaline impurities therein.

Next, a predetermined amount of an aqueous hypochlorite solution identical in quality to the afore-stated additional aqueous hypochlorite solution is supplied, wherein the said aqueous hypochlorite solution contains an unknown molar quantity of residual alkaline impurities therein, and wherein the said predetermined amount of aqueous hypochlorite solution corresponds to the previously-calculated increased injection rate of the additional aqueous hypochlorite solution. Such predetermined amount of aqueous hypochlorite solution is injected alone into the operative mixing unit of sterile water production device. Thereafter, a predetermined amount of hydrochloric acid solution is injected to that operative mixing unit in the presence of the thus-injected aqueous hypochlorite solution and continued to be injected stepwise thereinto, so that the hydrochloric acid solution is stepwise increased and mixed with that particular aqueous hypochlorite solution. In such stepwise injection processes, each time the hydrochloric acid solution is injected and mixed into the aqueous hypochlorite solution, a sterile water produced thereby is subjected to determination of its pH. After repetition of such titrimetric operation and pH determination, a relation between increasing rates of stepwise injection of hydrochloric acid solution and pH changes of sterile water being stepwise produced is defined arithmetically and formulated with regard to the present aqueous hypochlorite solution.

Figure 5:
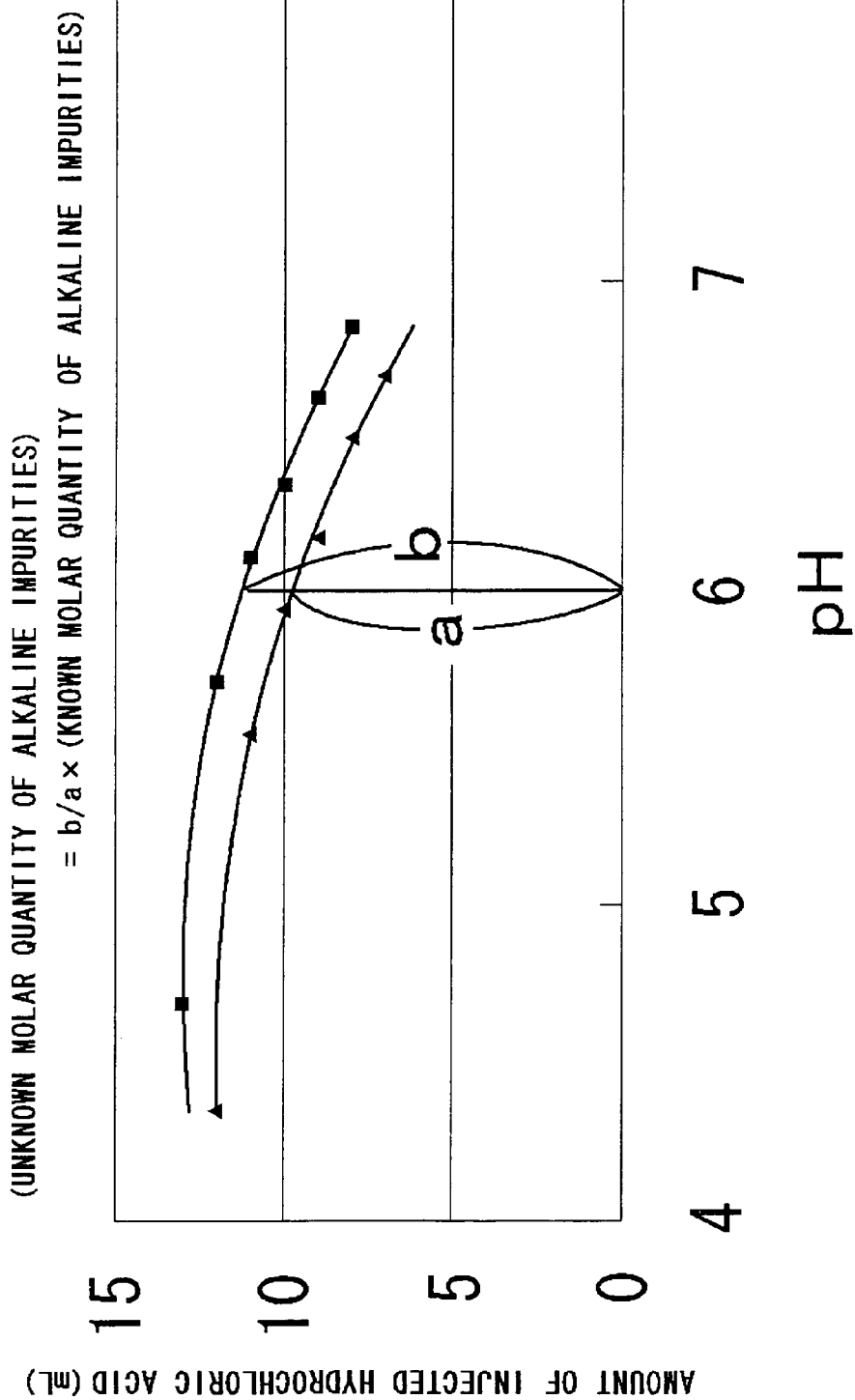
FIG. 5 A graph showing a generic arithmetical concept for determining the unknown molar quantity of residual alkaline impurities.

Then, reference is made to FIG. 5. With regard to the above-treated aqueous hypochlorite solution with unknown molar quantity of residual alkaline impurities, a relation between amounts of injected hydrochloric acid solution and pH changes of sterile water produced is plotted as shown. Likewise, with regard to a selected one of the thus-treated plurality of sample aqueous hypochlorite solutions each containing a known quantity of residual alkaline impurities, which is most analogous to that particular aqueous hypochlorite solution, a relation between amounts of injected hydrochloric acid solution and pH changes of sterile water produced is plotted as shown. Then, the thus-obtained two different pieces of data are subjected to comparison operation using the shown formula, in terms of a ratio between such known and unknown molar quantifies of residual alkaline impurities, thereby determining and obtaining a definite molar quantity of residual alkaline impurities present in the aforementioned additional aqueous hypochlorite solution whose molar quantity of residual alkaline impurities has been unknown.

Subsequent thereto, the revolution number of the hypo pump 28 is raised to increase injection rate of aqueous hypochlorite solution so as to inject a predetermined amount of the aforementioned further additional aqueous hypochlorite solution into the sterile water produced thus far, wherein such predetermined amount of the further additional aqueous hypochlorite solution is an amount required to yield additional content of hypochlorous acid in a resulting sterile water to be produced, to such a degree that a molar quantity of that particular hypochlorous acid is equal to the above-determined molar quantity of residual alkaline impurities. Accordingly, this injection of further additional aqueous hypochlorite solution in effect insures to maintain the preset concentration of residual chlorine in a final sterile water to be produced. However, such injection of the further additional aqueous hypochlorite solution has provided to the currently produced sterile water an extra amount of residual alkaline impurities, i.e., a corresponding amount of residual alkaline impurities present in that particular further additional aqueous hypochlorite solution, in addition to the previously stated residual alkaline impurities present in the additional aqueous hypochlorite solution. Hence, pH of sterile water produced at the present point is actually higher than the preset pH.

Then, the revolution number of the hydrochloric acid solution pump 20 is raised to increase rate of injection of hydrochloric acid solution from the previous rate, thereby injecting additional amount of hydrochloric acid solution into the thus-produced sterile water, while monitoring pH changes of sterile water being further produced due to such additional injection. Then, upon the pH of the sterile water having decreased back to the preset pH, the pump 20 is ceased to stop the injection of hydrochloric acid solution, and the additional amount of hydrochloric acid solution indicated at that point of time is read and stored. Accordingly, it is now appreciated that the afore-said extra amount of residual alkaline impurities as well as the previously determined molar quantity of residual alkaline impurities have been neutralized with the thus-injected additional amount of hydrochloric acid.

And further, the hypochlorite content in the aforementioned further additional aqueous hypochlorite solution has reacted with the injected additional amount of hydrochloric acid, thereby yielding additional hypochlorous acid in such an amount that compensates for the above-neutralized molar quantity of residual alkaline impurities in the previously stated additional aqueous hypochlorite solution, whereupon a resulting sterile water produced assuredly maintains the preset concentration of residual chlorine therein, while maintaining the preset pH for weak acidity, and therefore has a high sterilizing power.

Figure 6:
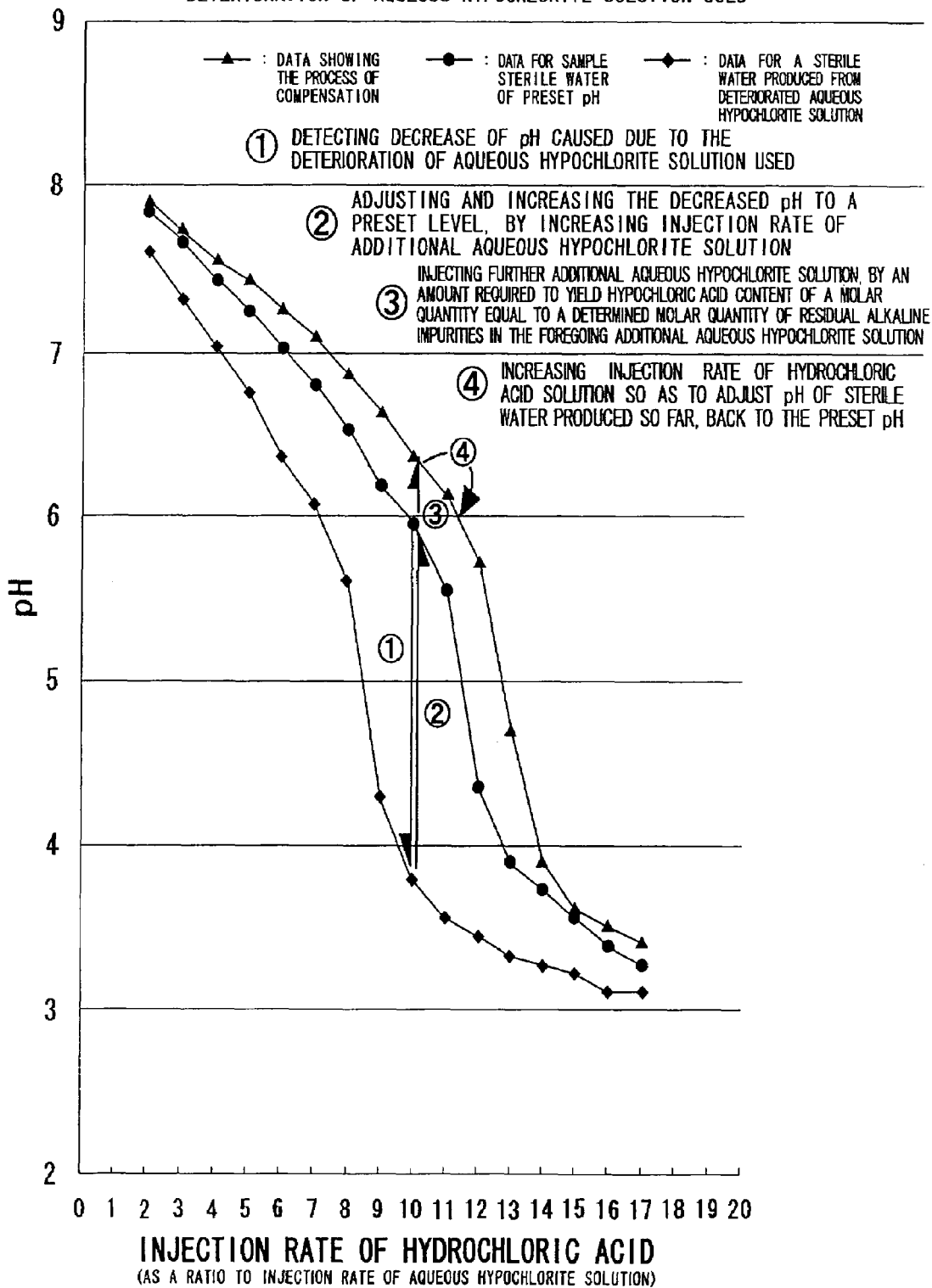
FIG. 6 A graph for showing a generic concept for adjustment and compensation for deterioration of aqueous hypochlorite solution used.

From the foregoing descriptions, it is seen that proper controls of the sterile water production device and adjustments are effected in compensation for deterioration of aqueous hypochlorite solution used in which a certain rate of hypochlorite content is deactivated, so as to produce an optimum resulting sterile water. In this respect, specific illustration is given in FIG. 6, wherein four steps from ① to ④ are shown explanatorily to facilitate the ease of understanding the required steps of the compensation for deterioration of aqueous hypochlorite solution used, in terms of a relation between the injection rate of hydrochloric acid solution and the corresponding pH changes of sterile water being produced.

The invention claimed is:

1. A method for controlling a sterile water production device operable to cause at least injection of an aqueous hypochlorite solution into a raw water to thereby produce a sterile water of weak acidity which contains a hypochlorous acid as an active ingredient, said method being characterized by the steps of:

detecting decrease of pH of said sterile water to a level smaller than a preset pH, and responsive thereto, increasing injection rate of said aqueous hypochlorite solution so as to inject an additional aqueous hypochlorite solution into said sterile water, so that the thus-decreased pH of the sterile water is increased back to said preset pH; then, determining a molar quantity of residual alkaline impurities present in the thus-injected additional aqueous hypochlorite solution;

calculating and obtaining an additional amount of said aqueous hypochlorite solution for injection of a predetermined amount of further additional aqueous hypochlorite solution, wherein said predetermined amount of further additional aqueous hypochlorite solution is an amount required to yield additional content of hypochlorous acid in a resulting sterile water to be produced, to such a degree that a molar quantity of said particular hypochlorous acid is equal to the thus-determined molar quantity of residual alkaline impurities; then, increasing injection rate of said aqueous hypochlorite solution so as to inject said predetermined amount of further additional aqueous hypochlorite solution into the sterile water produced thus far, thereby yielding sterile water of increased pH in which said molar quantity of said hypochlorous acid is equal to said determined molar quantity of residual alkaline impurities; and injecting an acid aqueous solution so as to decrease said increased pH back to said preset pH.

2. The method for controlling a sterile water production device, as described in claim 1, wherein said sterile water production device is operable to cause at least injection of an aqueous hypochlorite solution into a raw water to thereby produce a sterile water of weak acidity which contains a hypochlorous acid as an active ingredient, said method being further characterized by the steps of:

providing a plurality of aqueous hypochlorite solutions in a predetermined equal amount, said plurality of aqueous hypochlorite solutions being different from one another in terms of known molar quantity of residual alkaline impurities present therein; then, injecting a selected one of said plurality of aqueous hypochlorite solutions alone into the sterile water production device; thereafter, effecting stepwise acid injection comprising the step of injecting an acid stepwise into the sterile water production device, so that said acid is stepwise increased and intermixed with the predetermined amount of said selected one of said plurality of aqueous hypochlorite solutions, while determining pH of sterile water being produced in each step of said stepwise acid injection;

obtaining, from said stepwise acid injection, a relation between stepwise injection amounts of said acid and corresponding pH changes of sterile water being stepwise produced, with regard to said selected one of said plurality of aqueous hypochlorite solutions;

providing a predetermined amount of aqueous hypochlorite solution containing an unknown molar quantity of residual alkaline impurities therein, and injecting said predetermined amount of aqueous hypochlorite solution alone into the sterile water production device; thereafter, effecting stepwise acid injection comprising the step of injecting an acid stepwise into the sterile water production device, so that said acid is stepwise increased and intermixed with said predetermined amount of aqueous hypochlorite solution, while determining pH of sterile water being produced in each step of said stepwise acid injection;

obtaining, from said stepwise acid injection, a relation between stepwise injected amounts of said acid and corresponding pH changes of sterile water being stepwise produced, with regard to said predetermined amount of aqueous hypochlorite solutions;

executing a comparison operation by making comparison between said relation between stepwise injected amounts of said acid and corresponding pH changes of sterile water being stepwise produced with regard to said selected one of said plurality of aqueous hypochlorite solutions, and said relation between stepwise injected amounts of said acid and corresponding pH changes of sterile water being stepwise produced with regard to said predetermined amount of aqueous hypochlorite solution; and determining, from results of said comparison operation, said unknown molar quantity of said residual alkaline impurities in said predetermined amount of aqueous hypochlorite solution, to thereby obtain a definite molar quantity of the residual alkaline impurities in said particular predetermined amount of aqueous hypochlorite solution.

3. The method for controlling a sterile water production device, as described in claim 1, which is characterized in that said sterile water production device is a device operable to cause injection of an acid aqueous solution and said aqueous hypochlorite solution into said raw water to thereby produce said sterile water of weak acidity which contains said hypochlorous acid as active ingredient.

4. The method for controlling a sterile water production device, as described in claim 3, wherein said sterile water production device is a device operable to cause injection of an acid aqueous solution and said aqueous hypochlorite solution into said raw water to thereby produce a sterile water of weak acidity which contains a hypochlorous acid as an active ingredient, said method being further characterized by the steps of:

providing a plurality of aqueous hypochlorite solutions in a predetermined equal amount, said plurality of aqueous hypochlorite solutions being different from one another in terms of known molar quantity of residual alkaline impurities present therein; then, injecting a selected one of said plurality of aqueous hypochlorite solutions alone into the sterile water production device; thereafter, effecting stepwise acid injection comprising the step of injecting an acid stepwise into the sterile water production device, so that said acid is stepwise increased and intermixed with the predetermined amount of said selected one of said plurality of aqueous hypochlorite solutions, while determining pH of sterile water being produced in each step of said stepwise acid injection;

obtaining, from said stepwise acid injection, a relation between stepwise injection amounts of said acid and corresponding pH changes of sterile water being stepwise produced, with regard to said selected one of said plurality of aqueous hypochlorite solutions;

providing a predetermined amount of aqueous hypochlorite solution containing an unknown molar quantity of residual alkaline impurities therein, and injecting said predetermined amount of aqueous hypochlorite solution alone into the sterile water production device; thereafter, effecting stepwise acid injection comprising the step of injecting an acid stepwise into the sterile water production device, so that said acid is stepwise increased and intermixed with said predetermined amount of aqueous hypochlorite solution, while determining pH of sterile water being produced in each step of said stepwise acid injection;

obtaining, from said stepwise acid injection, a relation between stepwise injected amounts of said acid and corresponding pH changes of sterile water being stepwise produced, with regard to said predetermined amount of aqueous hypochlorite solutions;

executing a comparison operation by making comparison between said relation between stepwise injected amounts of said acid and corresponding pH changes of sterile water being stepwise produced with regard to said selected one of said plurality of aqueous hypochlorite solutions, and said relation between stepwise injected amounts of said acid and corresponding pH changes of sterile water being stepwise produced with regard to said predetermined amount of aqueous hypochlorite solution; and determining, from results of said comparison operation, said unknown molar quantity of said residual alkaline impurities in said predetermined amount of aqueous hypochlorite solution, to thereby obtain a definite molar quantity of the residual alkaline impurities in said particular predetermined amount of aqueous hypochlorite solution.

5. The method for controlling a sterile water production device, as described in claim 3, which is characterized in that said acid aqueous solution is hydrochloric acid.

6. The method for controlling a sterile water production device, as described in claim 5, wherein said sterile water production device is a device operable to cause injection of said acid aqueous solution and said aqueous hypochlorite solution into said raw water to thereby produce a sterile water of weak acidity which contains a hypochlorous acid as an active ingredient, said method being further characterized by the steps of:

providing a plurality of aqueous hypochlorite solutions in a predetermined equal amount, said plurality of aqueous hypochlorite solutions being different from one another in terms of known molar quantity of residual alkaline impurities present therein; then, injecting a selected one of said plurality of aqueous hypochlorite solutions alone into the sterile water production device; thereafter, effecting stepwise acid injection comprising the step of injecting an acid stepwise into the sterile water production device, so that said acid is stepwise increased and intermixed with the predetermined amount of said selected one of said plurality of aqueous hypochlorite solutions, while determining pH of sterile water being produced in each step of said stepwise acid injection;

obtaining, from said stepwise acid injection, a relation between stepwise injection amounts of said acid and corresponding pH changes of sterile water being stepwise produced, with regard to said selected one of said plurality of aqueous hypochlorite solutions;

providing a predetermined amount of aqueous hypochlorite solution containing an unknown molar quantity of residual alkaline impurities therein, and injecting said predetermined amount of aqueous hypochlorite solution alone into the sterile water production device; thereafter, effecting stepwise acid injection comprising the step of injecting an acid stepwise into the sterile water production device, so that said acid is stepwise increased and intermixed with said predetermined amount of aqueous hypochlorite solution, while determining pH of sterile water being produced in each step of said stepwise acid injection;

obtaining, from said stepwise acid injection, a relation between stepwise injected amounts of said acid and corresponding pH changes of sterile water being stepwise produced, with regard to said predetermined amount of aqueous hypochlorite solutions;

executing a comparison operation by making comparison between said relation between stepwise injected amounts of said acid and corresponding pH changes of sterile water being stepwise produced with regard to said selected one of said plurality of aqueous hypochlorite solutions, and said relation between stepwise injected amounts of said acid and corresponding pH changes of sterile water being stepwise produced with regard to said predetermined amount of aqueous hypochlorite solution; and determining, from results of said comparison operation, said unknown molar quantity of said residual alkaline impurities in said predetermined amount of aqueous hypochlorite solution, to thereby obtain a definite molar quantity of the residual alkaline impurities in said particular predetermined amount of aqueous hypochlorite solution.

* * * * *